US010218921B2

(12) United States Patent
Neal et al.

(10) Patent No.: US 10,218,921 B2
(45) Date of Patent: Feb. 26, 2019

(54) IMAGING SYSTEMS AND METHODS

(71) Applicant: Sensors Unlimited, Inc., Princeton, NJ (US)

(72) Inventors: Henry W. Neal, Irvine, CA (US); Joshua Lund, Dallas, TX (US); Marc Hansen, Hamilton, NJ (US); Timothy Beystrum, Doylestown, PA (US); Dmitry Zhilinsky, Richboro, PA (US); Michael D. Daugherty, Horsham, PA (US); Bert Blumenthal, Titusville, NJ (US); Jonathan Nazemi, Doylestown, PA (US); Andrew Eckhardt, Richboro, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 197 days.

(21) Appl. No.: 15/266,837

(22) Filed: Sep. 15, 2016

(65) Prior Publication Data

US 2018/0077364 A1    Mar. 15, 2018

(51) Int. Cl.
*H04N 7/18* (2006.01)
*H04N 5/33* (2006.01)
*F41G 3/14* (2006.01)
*F41G 3/16* (2006.01)
*G01J 5/10* (2006.01)
*H04N 5/353* (2011.01)
*G01S 5/16* (2006.01)
(Continued)

(52) U.S. Cl.
CPC ............. *H04N 5/332* (2013.01); *F41G 3/145* (2013.01); *F41G 3/16* (2013.01); *G01J 5/10* (2013.01); *G01S 5/16* (2013.01); *G01S 7/4804* (2013.01); *H04N 5/3535* (2013.01); *G01J 2005/0077* (2013.01); *G01J 2005/106* (2013.01)

(58) Field of Classification Search
CPC ................ G01J 5/20; G01J 5/02; B82Y 20/00
USPC ........................ 250/338.4, 208, 232; 348/158
See application file for complete search history.

(56) References Cited

U.S. PATENT DOCUMENTS 5,760,398 A * 6/1998 Blackwell ................. G01J 5/02
250/332
5,811,815 A * 9/1998 Marshall ................... G01J 5/20
250/338.4

(Continued)

FOREIGN PATENT DOCUMENTS

EP           2816309 A2    12/2014
WO    WO-2013165499 A2    11/2013

OTHER PUBLICATIONS

Extended European Search Report received from European Patent Office (EPO) dated Feb. 9, 2018 for Application No. 17191301.5.

*Primary Examiner* — Gims S Philippe
(74) *Attorney, Agent, or Firm* — Locke Lord LLP; Scott D. Wofsy; Christopher J. Cillié

(57) ABSTRACT

An imaging method includes receiving electromagnetic radiation at a focal plane array of a handheld device. The electromagnetic radiation is processed within the handheld device, and visible images are displayed on the handheld device. The displayed visible images are indicative of a scene, and include a designator and a designator identifier when a high frequency laser pulse is in the scene. The designator and designator identifier represent the high frequency pulsed electromagnetic radiation received by the focal plane array when a high frequency pulse is present in the scene.

17 Claims, 4 Drawing Sheets

(51) Int. Cl.
*G01S 7/48* (2006.01)
*G01J 5/00* (2006.01)

(56) References Cited

U.S. PATENT DOCUMENTS

| | | | |
|---|---|---|---|
| 6,157,404 A * | 12/2000 | Marshall | G01J 5/20 250/338.4 |
| 2006/0054780 A1 * | 3/2006 | Garrood | B82Y 20/00 250/208.1 |
| 2011/0121159 A1 | 5/2011 | Mourar et al. | |
| 2016/0097857 A1 | 4/2016 | Gokay et al. | |
| 2016/0161587 A1 | 6/2016 | Caplan | |

* cited by examiner

IMAGING SYSTEMS AND METHODS

BACKGROUND OF THE INVENTION

1. Field of the Invention

The present disclosure generally relates to imaging, and more particularly to displaying visible images of a scene with a designator when designator illumination is present in the scene.

2. Description of Related Art

Lasers are commonly used in observation and targeting applications, for example, in guiding laser-guided munitions or weapons to a target. Targeting systems may observe and detect the range of an object. Targeting systems may also designate a target for detection by another weapon system in order to deliver the weapon to the designated target. Such targeting systems generally use a set of devices to perform the operations described with precision, for example, global positioning systems, observation binoculars, laser rangefinders, digital magnetic compasses, and laser designators.

Integrating multiple devices into a common device can be challenging. For example, heat generated by electronics associated with one device may influence the operation of another device, and must be removed from the system in order to allow operation of each of the devices incorporated in the system. The devices incorporated in the system can also require considerable amounts of electrical power, requiring an operator to frequently change batteries and/or provide power from an external power source. Components of each separate device must also be ruggedized in a system arrangement to ensure availability of the devices in difficult operating environments.

Such conventional methods and systems have generally been considered satisfactory for their intended purpose. However, there is still a need in the art for improved targeting systems and methods. The present disclosure provides a solution for this need.

SUMMARY OF THE INVENTION

An imaging method includes receiving electromagnetic radiation at a focal plane array of a handheld device. The electromagnetic radiation is processed within the handheld device, and visible images are displayed on the handheld device. The displayed visible images are indicative of a scene, and include a designator and a designator identifier when a high frequency laser pulse is in the scene. The designator and designator identifier represent the high frequency pulsed electromagnetic radiation received by the focal plane array when a high frequency pulse is present in the scene.

In certain embodiments, the electromagnetic radiation can be converted into image data and high frequency pulse data. Converting the electromagnetic radiation into image data can include converting the electromagnetic radiation into pixel photocurrents. The image data can be representative of integrated pixel photocurrents during a first exposure period. Converting the electromagnetic radiation into high frequency pulse data can include converting the electromagnetic radiation into pixel voltages. The high frequency pulse data can be representative of presence, or lack of presence, of a high frequency laser pulse in the pixel voltages during a second exposure period.

In accordance with certain embodiments, the image data and the high frequency pulse data can be acquired from a common focal plane array. The second exposure period can have the same duration as the first exposure period. The second exposure period can have a duration that is different than duration of the first exposure period. The second exposure period can be shorter than the first exposure period. The second exposure period can be longer than the first exposure period. The image data and the high frequency pulse data can be acquired from electromagnetic radiation within a common waveband.

It is contemplated that, in accordance with certain embodiments, the common waveband can be an infrared waveband, a thermal waveband, a short-wavelength infrared radiation (SWIR) waveband, or a near-infrared radiation (NIR) waveband. The common waveband can be between about 0.7 and about 1.7 microns. The designator can be inserted into the visible image when the high frequency pulse data indicates presence of pulsed laser illumination in the scene. The designator can be inserted in the visible image in relation to location of pulsed laser illumination of the scene. A designator identifier can be inserted into the visible image. The designator identifier can be inserted into the visible image when the high frequency pulse data indicates presence of pulsed laser illumination in the scene corresponding to a predetermined pulse repetition frequency (PRF) code.

A handheld imaging system includes a housing, a focal plane array disposed in the housing, and a display disposed in the housing. A processor is in operable communication with the focal plane array and the display, the processor being configured to process image data and high frequency laser pulse data received from the focal plane array and control the display to show visible images of the scene on the display. When the high frequency laser pulse data indicates that high frequency pulsed laser illumination is present in the scene, the processor inserts a designator into the visible image. When the high frequency laser pulse data indicates that high frequency pulsed laser illumination present in the scene has a PRF code, the processor inserts a designator identifier into the visible image.

In certain embodiments, the focal plane array can include a photodetector array arranged to receive electromagnetic radiation and convert the electromagnetic radiation into a photocurrent. A readout integrated circuit can be connected to the photodetector array to form the focal plane array. The readout integrated circuit can be arranged to convert the photocurrent into two voltages. The first voltage can be representative of the scene, and can be converted into image data. The second voltage can be representative of high frequency pulsed laser illumination present in the scene, and can be converted into high frequency pulse data.

In accordance with certain embodiments, the processor can be in operable communication with the focal plane array through first and second channels. The first channel can provide the image data. The image data can include integrated photocurrents from pixels of the focal plane array integrated over a first exposure period. The second channel can provide the high frequency pulse data. The high frequency pulse data can include voltages from pixels of the focal plane array over a second exposure period.

It is also contemplated that, in accordance with certain embodiments, the processor can be in communication with a memory. The memory can be non-transitory machine readable medium having instructions recorded on it that, when read by the processor, cause the processor to execute the above described methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
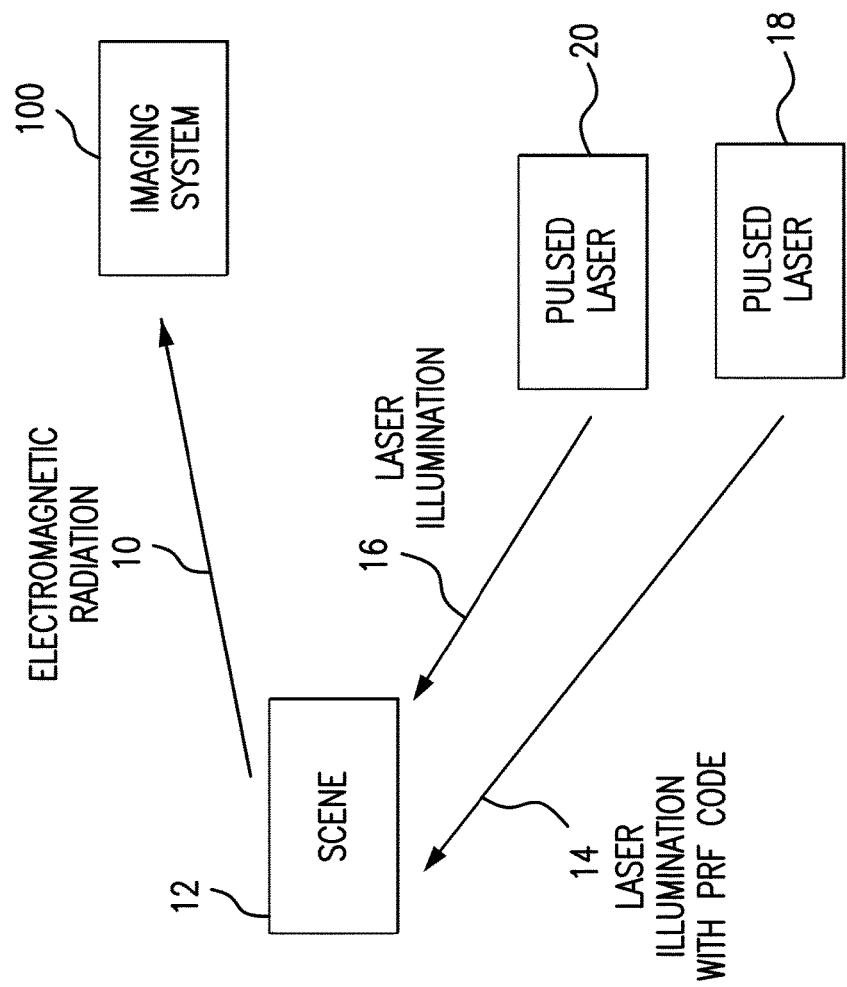
FIG. 1 is a schematic view of an exemplary embodiment of an imaging system constructed in accordance with the present disclosure, showing the imaging system receiving electromagnetic radiation from a scene with designator illumination present in the scene.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems and imaging methods in accordance with the disclosure, or aspects thereof, are provided in FIGS. 2-4, as will be described. The systems and methods described herein can be used to display visible images including designators and designator identifiers in a handheld short-wavelength infrared radiation (SWIR) imaging system, through the present disclosure is not limited to handheld devices or to SWIR imaging systems in general.

Referring now to FIG. 1, imaging system 100 is shown. Imaging system 100 is arranged to receive electromagnetic radiation 10 from a scene 12 and display a visible image (shown in FIG. 2) of the scene. It is contemplated that electromagnetic radiation 10 used to construct the visible image be electromagnetic radiation within thermal waveband band, a near-infrared radiation (NIR) waveband, a SWIR waveband, and/or electromagnetic radiation within a waveband between about 0.7 and about 1.7 microns. Electromagnetic radiation 10 can include pulsed electromagnetic radiation 14 and/or 16 present in scene 12 from one or more pulsed laser illuminators, e.g., a first laser source 18 and/or one or more second laser sources 20. The pulsed electromagnetic radiation, e.g., pulsed electromagnetic radiation 14, can include a pulse repetition frequency (PRF) code associated with a particular pulsed laser source illuminator, e.g., first laser source 18.

Figure 2:
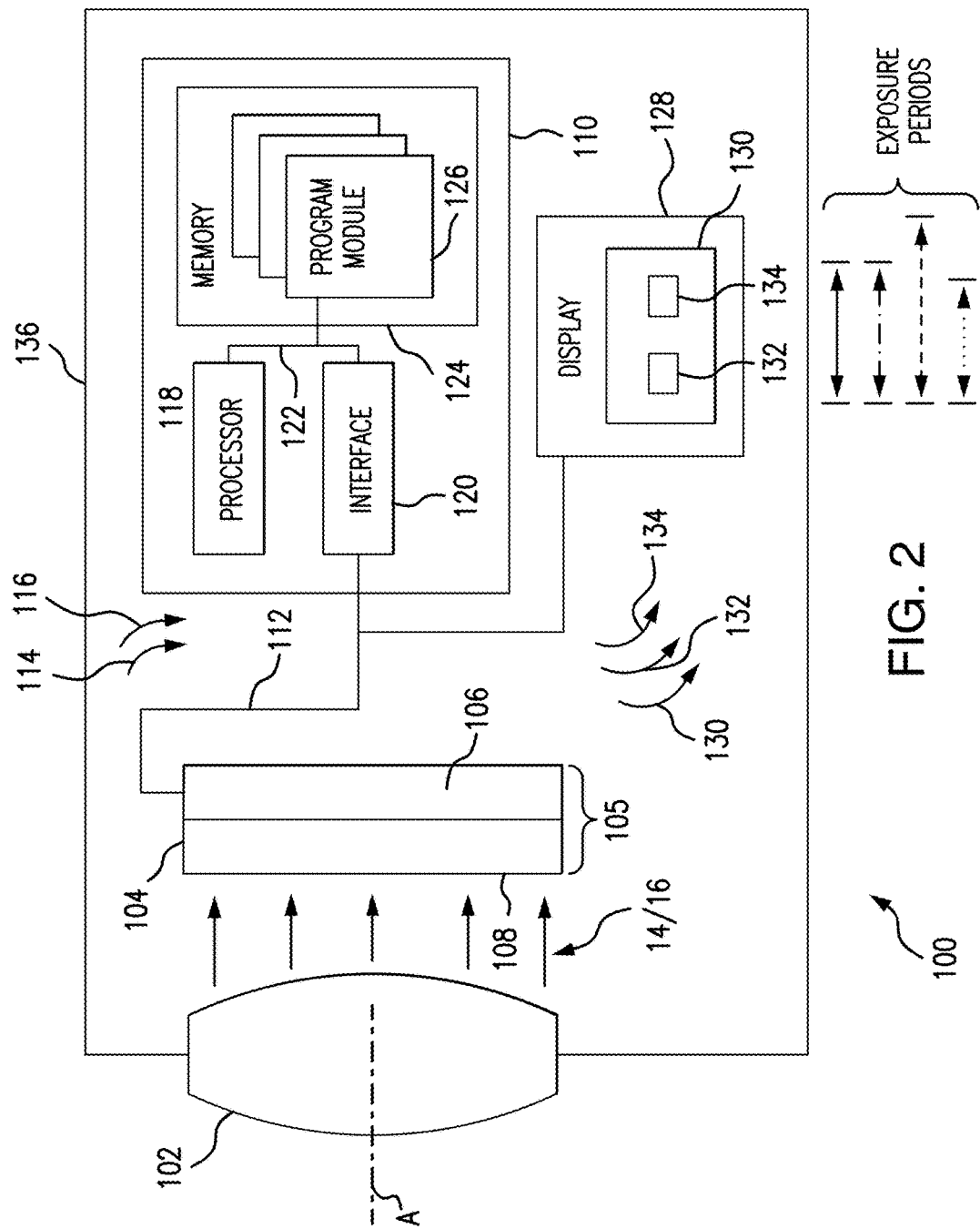
FIG. 2 is a schematic view of the imaging system of FIG. 1, showing the imaging system displaying a visible image of the scene with a designator and a designator identifier.

With reference to FIG. 2, imaging system 100 is shown. Imaging system 100 includes a lens 102, a focal plane array 105, a controller 110, and a display 128. Lens 102 is optically coupled to focal plane array 105 and is configured to collect electromagnetic radiation 10 (shown in FIG. 1) and provide the electromagnetic radiation 10 to a surface 108 of focal plane array 105.

Focal plane array 105 includes a photodetector array 104 with a surface 108 and a readout integrated circuit 106. Photodetector array 104 has plurality of photodiode devices arranged in a plane orthogonal to an optical axis A extending between lens 102 and photodetector array 104 configured to convert incident electromagnetic radiation 10 (shown in FIG. 1) into pixel photocurrents, the pixel photocurrents corresponding to an intensity of short-wavelength infrared electromagnetic radiation incident upon respective photodiode.

Readout integrated circuit 106 is connected to photodetector array 104. Readout integrated circuit 106 has a plurality of pixel cells corresponding to the photodiodes of the photodetector array and is configured to convert photocurrents generated within photodetector array 104 into image data and high frequency pulse data. In this respect readout integrated circuit 106 converts photocurrents generated within respective photodiodes of photodetector array 104 into pixel voltages by integrating the photocurrents over a first exposure period to form image data 114, which readout integrated circuit 106 provides to controller 110 over a link 112. Readout integrated circuit 106 also converts photocurrents generated within photodiodes of photodetector array 104 into pixel voltages, which are surveyed over a second exposure period to generate high frequency pulse data 116, which readout integrated circuit 106 also provides to controller 110 over link 112.

Link 112 has a first channel for image data 114 and a second channel for high frequency pulse data 116, connecting readout integrated circuit 106 with controller 110. It is contemplated that readout integrated circuit 106 can provide image data to controller 110 using a first exposure period and high frequency pulse data to controller using a second exposure period (show with a dashed/dotted line) that is equal to the first exposure period (shown in solid line), a second exposure period (shown in dashed line) that is longer than the first exposure period, or a second exposure period (shown in dotted line) that is shorter than the first exposure period.

Controller 110 includes a processor 118, and interface 120, and internal bus 122, and a memory 124. Processor 118 may include one or more of an application-specific integrated circuit (ASIC) or field-programmable gate array (FPGA) device, and is communicative with readout integrated circuit 106 via interface 120 and link 112. Processor 118 is also communicative with memory 124 through internal bus 122. Memory 124 includes a non-transitory machine readable medium having a plurality of program modules 126 recorded thereon. Program modules 126 have instructions that, when read by processor 118, cause processor 118 to undertake certain actions. In this respect the instructions cause processor 118 to acquire image data 114 within the first exposure period and high frequency pulse data 116 within the second exposure period.

Figure 4:
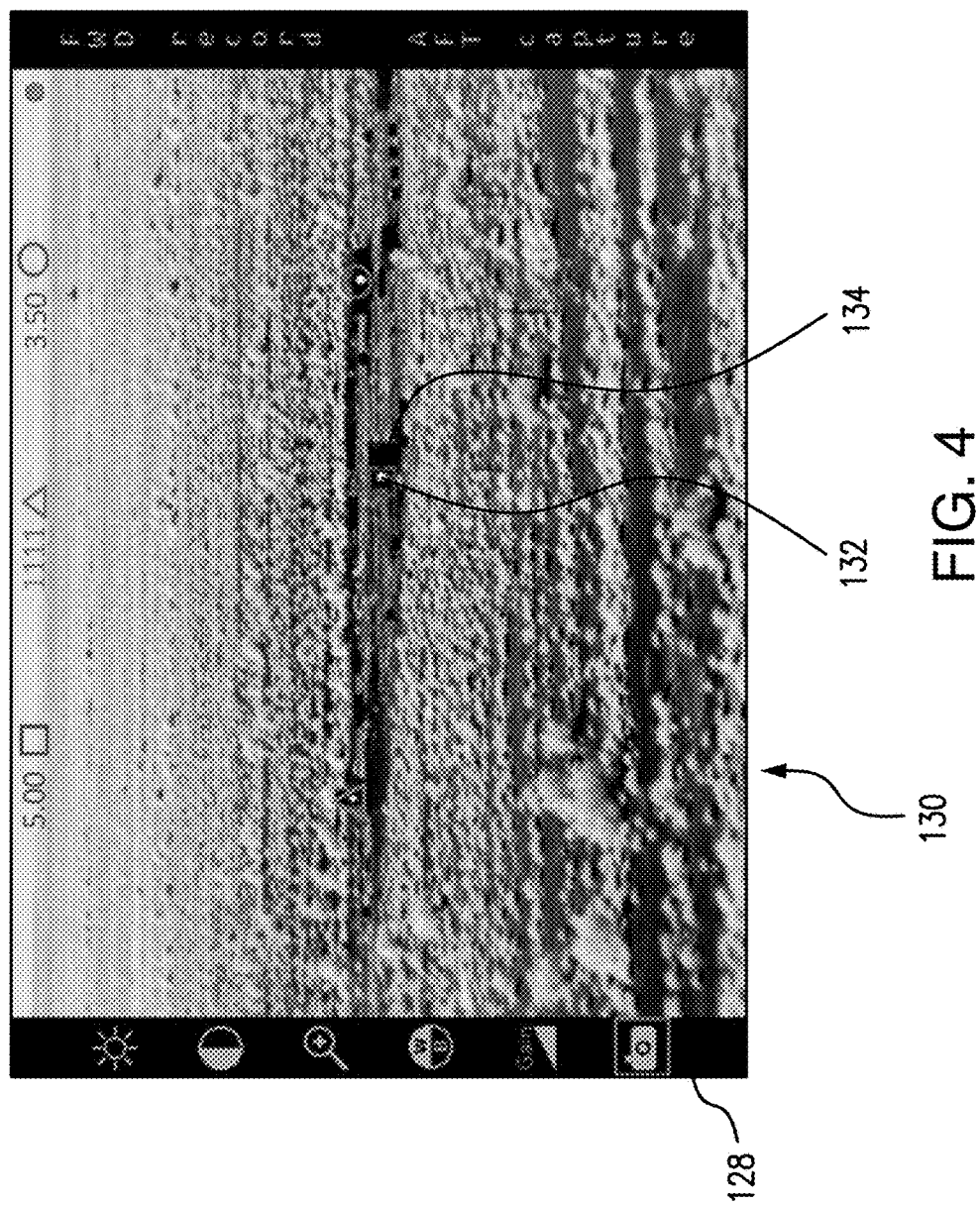
FIG. 4 is an end view of the imaging system of FIG. 3, showing a visible image with designators and designator identifiers displayed on the display of the handheld imaging system.

With reference to FIGS. 2 and 4, the instructions cause processor 118 to construct a visible image 130 using the image data, which processor 118 causes to be displayed on display 128. When the high frequency pulse data indicates presence of high frequency laser pulse illumination in scene 12 (shown in FIG. 1), the instructions further cause processor 118 to generate a designator 132, which processor 118 causes designator 132 to be inserted within visible image 130 on display 128. When the high frequency pulse data indicates presence of high frequency laser pulse illumination in scene 12 which is associated with a predetermined PRF code, which processor 118 causes a designator identifier 134 to be inserted within visible image 130 on display 128. Designator 132 and/or designator identifier 134 can be inserted within visible image 130 in a location corresponding to the location of the high frequency laser pulse illumination within scene 12.

Figure 3:
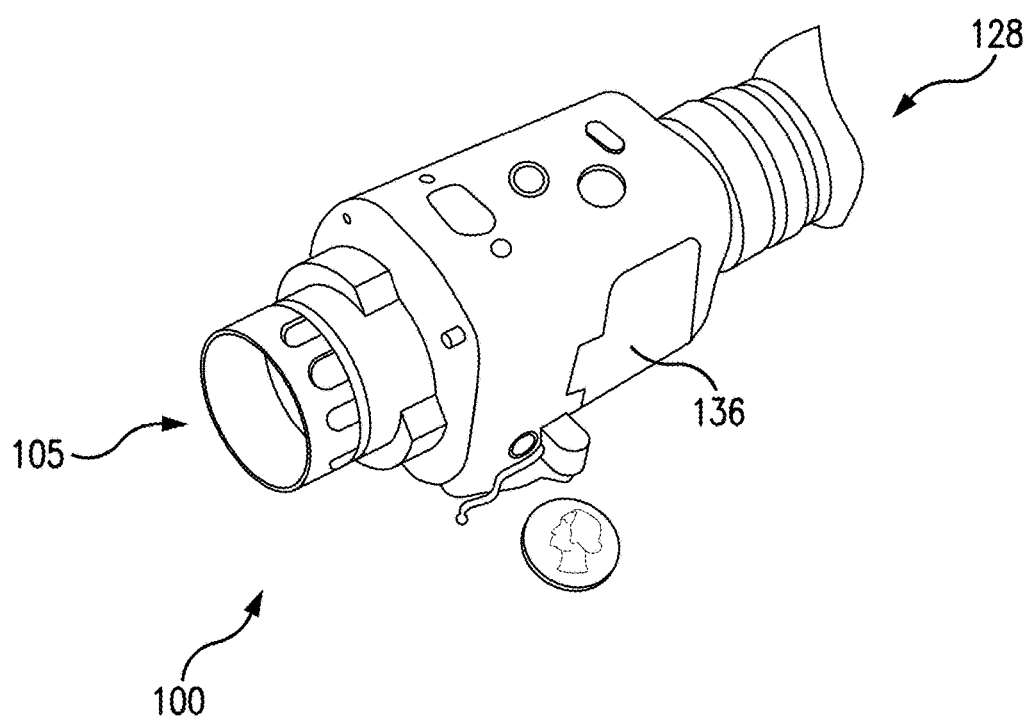
FIG. 3 is a perspective view of an exemplary embodiment of the imaging system of FIG. 1, showing a handheld imaging system with a single focal plane array and display mounted in a common housing.

With reference to FIG. 3, display 128 is fixed relative to single focal plane array 105 within a common housing 136. It is contemplated that housing 136 can be arranged as handheld, weapon-mounted, or helmet-mounted observation device. Display 128 can be, in accordance with certain embodiments, an eyepiece for presenting to a user a visible image of a scene acquired using SWIR image data, a designator in the visible image corresponding with a laser designator in the scene, and a designator identifier associated with designator and corresponding to a PRF code carried by the designator. As will be appreciated by those of skill in the art, generating a visible image and concurrently inserting and decoding a designator with a single focal plane array allows for imaging system to be relatively small and compact, and comparatively indicated by the size of imaging system 100 in relation to the coin shown in FIG. 3.

With continuing reference to FIG. 2, memory 124 may include any combination of one or more computer readable medium(s). Memory 124 may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A related imaging method includes receiving electromagnetic radiation, e.g., electromagnetic radiation 10 (shown in FIG. 1) at a focal plane array, e.g., focal plane array 105 (shown in FIG. 2), of a handheld device, e.g., imaging system 100 (shown in FIG. 3). The electromagnetic radiation is processed within the handheld device, and visible images, e.g., visible image 130 (shown in FIG. 2) are displayed on the handheld device. The displayed visible images are indicative of a scene, e.g., scene 12 (shown in FIG. 1). A designator, e.g., designator 132 (shown in FIG. 2), can be inserted into the scene when a high frequency laser pulse is in the scene. A designator identifier, e.g., designator identifier 134 (shown in FIG. 2), can be inserted into the scene when the high frequency laser pulse is modulated with a PRF code.

The electromagnetic radiation is converted into image data, e.g., image data 114 (shown in FIG. 2), and high frequency pulse data, e.g., high frequency pulse data 116 (shown in FIG. 2). Converting the electromagnetic radiation into image data includes converting the electromagnetic radiation into pixel voltages, which is representative of integrated pixel photocurrents during a first exposure period (shown in solid line in FIG. 2). The image data and the high frequency pulse data can be converted from electromagnetic radiation acquired by the focal plane array from within a common waveband, e.g., from a SWIR waveband or a waveband between 0.7 and 1.7 microns.

Converting the electromagnetic radiation into high frequency pulse data includes converting the electromagnetic radiation into pixel voltages. The high frequency pulse data is representative of presence, or lack of presence, of a high frequency laser pulse in the pixel voltages during a second exposure period. In certain embodiments the high frequency pulse data is a binary bitmap of the scene with high bits and low bits. High bits within the bitmap can indicate the presence of designator high frequency pules at the bitmap location. Low bits within the bitmap can indicate the lack of presence within at bitmap locations.

The image data and the high frequency pulse data can be acquired from a common focal plane array, e.g., focal plane array 105 (shown in FIG. 2). The second exposure period can have a duration (shown in dotted/dashed line in FIG. 2) that is the same duration as the first exposure period. The second exposure period can have a duration that is different than duration of the first exposure period. The second exposure period can have a duration (shown in dotted line in FIG. 2) that is shorter than the first exposure period. The second exposure period can have a duration (shown in dashed line in FIG. 2) that is longer than the first exposure period.

The designator can be inserted into the visible image when the high frequency pulse data indicates presence of pulsed laser illumination in the scene. The designator can be inserted in the visible image in relation to location of pulsed laser illumination of the scene, for example, in registration with a location wherein pulsed laser illumination appeared during the second time period. A designator identifier can be inserted into the visible image. The designator identifier can be inserted into the visible image when the high frequency pulse data indicates presence of pulsed laser illumination in the scene corresponding to a predetermined PRF code.

The systems and methods described herein, therefore, a handheld, weapon mounted, or helmet mounted system that creates a short-wavelength infrared radiation image with the ability to see lasers with wavelengths between 0.7 microns and 1.7 microns. The techniques described above are customizable for particular applications, and may be used for 1064 nanometer pulsed lasers and/or 1550 nanometer pulsed lasers. Moreover, the handheld unit can have a single photodetector array and a single objective lens to capture SWIR imagery, create imagery that is transferrable to a visible display for creating a visible representation of the SWIR image, as well as show a visible location of the laser energy within the visible image, and additionally display a PRF code associated with the visible location of the laser image in the visible image.

While there have been shown and described illustrative embodiments that gamify risk management services, it is to be understood that various other adaptations and modifications may be made within the spirit and scope of the embodiments herein. For example, the embodiments have been shown and described herein with relation to particular display elements; however, the embodiments in their broader sense are not limited to such display elements but can encompass a variety of display elements.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., one or more media such as disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The methods and systems of the present disclosure, as described above and shown in the drawings, provide imaging systems and methods with superior properties including the capability for a user to see SWIR laser energy, identify the laser energy PRF code, all simultaneously with a single handheld unit that have a single photodetector array and a single objective lens. All the imagery can be displayed through an eyepiece by viewing a visible display representation of the scene, the laser designator location, and PRF code associated with the laser designator. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging method, comprising:
   receiving electromagnetic radiation at a focal plane array of a handheld device;
   processing the received electromagnetic radiation within the handheld device;
   displaying visible images on the handheld device indicative of a scene including a designator and a designator identifier, the designator and designator identifier being representative of pulsed electromagnetic radiation received by the focal plane array; and
   converting the electromagnetic radiation into image data and comprising converting the electromagnetic radiation into high frequency pulse data using a common focal plane array,
   wherein the image data includes pixel photocurrents integrated over a first exposure period, wherein the high frequency pulse data includes voltages representative of presence, or lack of presence, of high frequency laser illumination within a second exposure period, and wherein the second exposure interval has a shorter duration than the first exposure interval.

2. The method as recited in claim 1, wherein the electromagnetic radiation is within a waveband between 0.7 and 1.7 microns.

3. The method as recited in claim 1, wherein the electromagnetic radiation includes pulsed electromagnetic radiation within a waveband between 0.7 and 1.7 microns.

4. The method as recited in claim 1, further comprising converting the electromagnetic radiation into image data.

5. The method as recited in claim 4, wherein the image data includes pixel photocurrents integrated over a first exposure period.

6. The method as recited in claim 1, further comprising converting the electromagnetic radiation into high frequency pulse data.

7. The method as recited in claim 6, wherein the high frequency pulse includes peak pixel voltages reported within a second exposure period.

8. The method as recited in claim 6, wherein the high frequency pulse data is representative of presence, or lack of presence, of high frequency laser illumination in the scene.

9. The method as recited in claim 1, wherein the image data and the high frequency pulse data are acquired from electromagnetic radiation in a waveband between 0.7 and 1.7 microns.

10. The method as recited in claim 1, further comprising constructing a visible image using the image data.

11. The method as recited in claim 1, further comprising generating the designator using the high frequency pulse data.

12. The method as recited in claim 1, further comprising generating the designator identifier using the high frequency pulse data.

13. A handheld imaging system, comprising:
a housing;
a focal plane array disposed in the housing;
a display disposed in the housing;
a processor, in operable communication with the focal plane array and the display, the processor being configured to process image data received at the focal plane array and control the display to show visible images indicative of a scene and including a designator and a designator identifier when high frequency pulsed laser illumination is present in the scene; and
a non-transitory machine readable memory connected to the processor, the memory having instructions recorded thereon that, when read by the processor, cause the processor to:
receive image data;
construct a visible image using the image data;
display the image on the display;
receive high frequency pulse data; and
insert into the visible image a designator when the high frequency pulse data indicates that high frequency pulsed laser illumination is present in the scene.

14. The imaging system as recited in claim 13, wherein the focal plane array includes a photodetector array and a readout integrated circuit disposed in electrical communication with the photodetector array.

15. The imaging system as recited in claim 14, wherein the photodetector array is configured to convert incident electromagnetic radiation in a waveband between 0.7 and 1.7 microns into pixel voltages.

16. The imaging system as recited in claim 13, further comprising first and second channels connecting the processor with the focal plane array, the first channel being an image data channel and the second channel being a high frequency pulse data channel.

17. The imaging system as recited in claim 13, wherein the instructions further cause the processor to insert into the scene a designator identifier when high frequency pulse data present in the scene includes a pulse repetition frequency code.

* * * * *